(12) United States Patent
Henderson et al.

(10) Patent No.: US 7,202,781 B2
(45) Date of Patent: *Apr. 10, 2007

(54) AUTOMATIC WATCHING SYSTEM

(75) Inventors: David Henderson, Commerce Township, MI (US); Gordon Henderson, Linden, MI (US); Jerry Henderson, Plymouth, MI (US)

(73) Assignee: See Progress, Inc., Brighton, MI (US)

( * ) Notice: Subject to any disclaimer, the term of this patent is extended or adjusted under 35 U.S.C. 154(b) by 239 days.

This patent is subject to a terminal disclaimer.

(21) Appl. No.: 10/695,697

(22) Filed: Oct. 29, 2003

(65) Prior Publication Data

US 2004/0113784 A1 Jun. 17, 2004

Related U.S. Application Data

(63) Continuation-in-part of application No. 10/272,069, filed on Oct. 16, 2002.

(60) Provisional application No. 60/332,228, filed on Nov. 14, 2001, provisional application No. 60/329,909, filed on Oct. 17, 2001.

(51) Int. Cl.
*B60R 25/10* (2006.01)

(52) U.S. Cl. ............. 340/541; 340/426.18; 340/426.15
(58) Field of Classification Search ............. 340/573.1, 340/517, 506, 426.1, 426.19, 945, 426.15, 340/426.18, 541; 348/148, 151
See application file for complete search history.

(56) References Cited

U.S. PATENT DOCUMENTS 6,559,769 B2 * 5/2003 Anthony et al. ............ 340/574
2001/0010541 A1 * 8/2001 Fernandez et al. .......... 348/143

\* cited by examiner

*Primary Examiner*—Julie Bichngoc Lieu
(74) *Attorney, Agent, or Firm*—Amy E. Rinaldo; Kohn & Associates, PLLC

(57) ABSTRACT

There is provided a monitoring system for remotely monitoring an item or activity, the monitoring system including a recording device for recording a visual record of the item, a communicator for communicating the visual record, and a security device for controlling access to the monitoring system. Also provided is a method of remotely monitoring an item by recording a digital image of the item, communicating the digital image of the item through a communication system, and accessing the digital image using a secured access device.

12 Claims, 2 Drawing Sheets

AUTOMATIC WATCHING SYSTEM

CROSS REFERENCE TO RELATED APPLICATIONS

This application is a continuation-in-part of U.S. patent application Ser. No. 10/272,069, filed Oct. 16, 2002, which claims the benefit U.S. Provisional Application No. 60/329,909, filed Oct. 17, 2001, and Ser. No. 60/332,228, filed Nov. 14, 2001, both of which are incorporated herein by reference.

BACKGROUND OF THE INVENTION

1. Field of the Invention

The present invention relates to an automated system for monitoring a selected item. More specifically, the present invention relates to an automated system functioning via the Internet.

2. Description of Related Art

Image communication systems span a variety of applications. One such application is security monitoring. Security monitoring typically involves system control and display functions located at a central station. The central station includes multiple emanating video-communication paths, each path connecting to a remotely-located display camera. Traditionally, the significant expense of security monitoring systems has limited their practicability to larger facilities.

Recent developments in communication standards and compression/decompression techniques have permitted enhanced security-system implementations. One generally described approach involves using a remote camera that responds to changes in motion or audio as a determining factor for transmitting captured video and audio data to the control station. Another approach uses a remote server station that connects to several cameras, with the server station coupling to a telephone line for reporting back to the control station. These and other recent implementations are directed to markets ranging from retail shops to large industrial warehouses.

Widespread acceptance and usage of security-system implementations are largely a function of cost. As with most other systems, reduced cost is realized through cost-effective mass production. The initial costs to affect such a mass production, however, can be exorbitant. Moreover, widespread acceptance and usage of such technology cannot be forced, even when appropriately addressing the marketing needs and overcoming the exorbitant costs of the mass production equipment. Consequently, efforts to launch the appropriate technology for practicable acceptance and usage of security systems have been difficult.

Additionally, the security systems have revolved solely around homes. There has been no development of security or monitoring systems for use in monitoring items aside from homes. It would be beneficial to develop a security system that can be used for monitoring other items aside from homes. Such a system could be used for monitoring a day care center, an automobile repair shop, or other such item or location. It would also be beneficial if such monitoring system could be accessed via a communication system such as the Internet.

SUMMARY OF THE INVENTION

According to the present invention, there is provided a monitoring system for remotely monitoring an item, the monitoring system including a recording device for recording a visual record of the item, a communicator for communicating the visual record, and a security device for controlling access to the monitoring system. Also provided is a method of remotely monitoring an item by recording a digital image of the item, communicating the digital image of the item through a communication system, and accessing the digital image using a secured access device.

DESCRIPTION OF THE DRAWINGS

Other advantages of the present invention are readily appreciated as the same becomes better understood by reference to the following detailed description when considered in connection with the accompanying drawings wherein.

DETAILED DESCRIPTION OF THE INVENTION

Figure 1:
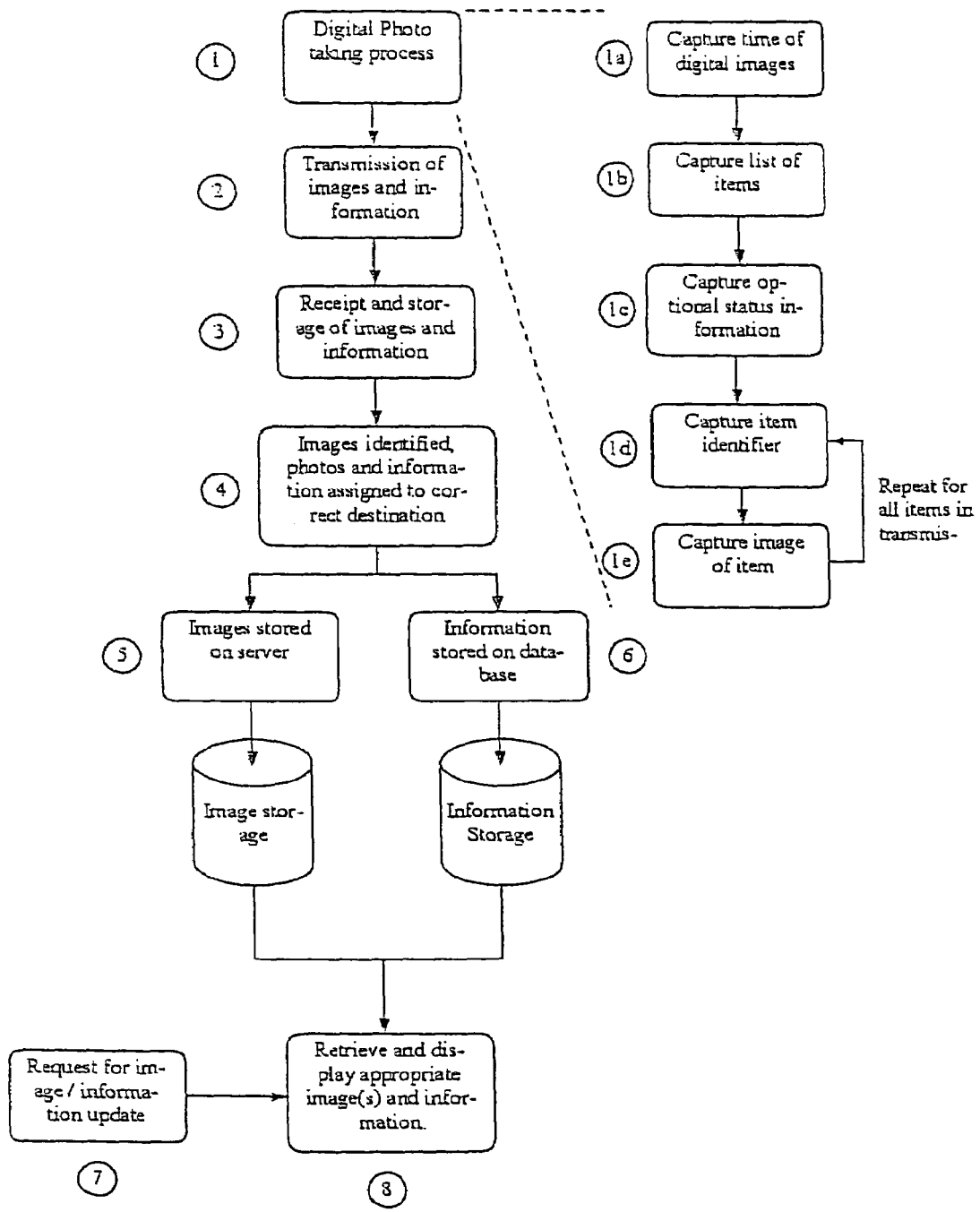
FIG. 1 is a flow chart depicting the flow of information in the system of the present invention.
Figure 2:
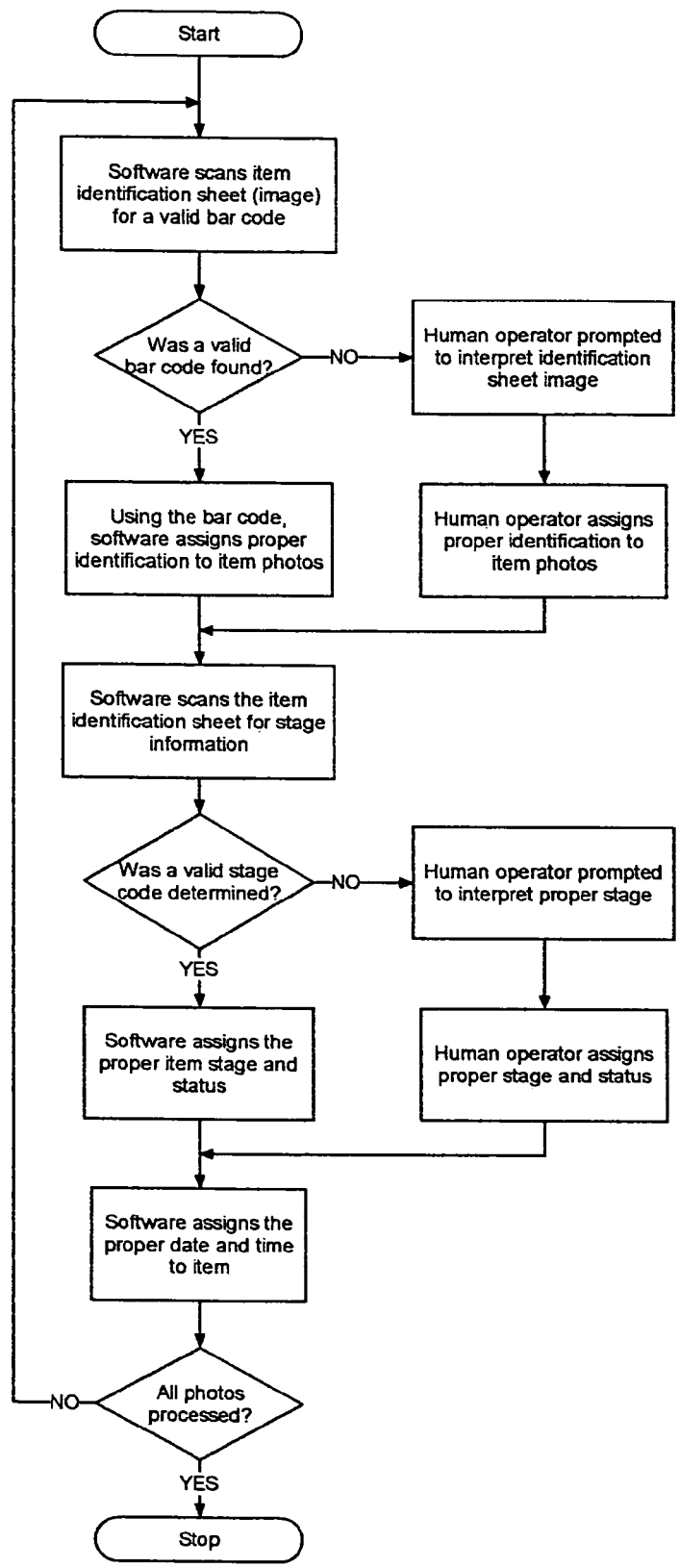
FIG. 2 is a flow chart depicting the flow of information in the preferred system of the present invention.

Generally, the present invention provides a monitoring system. The monitoring system allows an individual to monitor a specific item via a communication system. The communication system includes a recording device for recording a visual record of the item, and a communicating device for communicating the visual record. The system can also include a security device for controlling access to the monitoring system. The system is preferably automated.

The terms "items" and/or "activities" are intended to include, but are not limited to, vehicles, manufacturing facilities/factories, storage facilities, construction sites, and other similar items. Activities or locations that can be monitored include, but are not limited to, day care centers, campgrounds, schools, and other similar facilities.

By "automated" it is meant that a computer system, or any other automated system, is installed to control immediate and virtual management of the services.

The phrase "recording device" as used herein is intended to include, but is not limited to, a digital camera or other camera which can record an image. The image can later be converted to a digital picture. This conversion can take place using a scanner or other similar device that converts the image to a digital image.

While any digital camera can be used a preferred camera is described herein. The preferred camera includes the following features. On the upper panel of the camera housing there can be a digital display window composed of three sections. Adjacent these sections are positioned three controlling push buttons. In an upper right-hand portion of the front panel of the camera housing is formed a recess having an opening to receive a mode setting member or card. This card has six binary bits and a common bus that are to be read by respective sensing contacts within the camera housing. The first three of the bits give information representative selectively of five automatic exposure modes, namely, the shutter pre-selection automatic diaphragm range (hereinafter referred to as TP), the diaphragm pre-selection automatic shutter time range (FP), the shutter pre-selection magic program (TPM), the diaphragm pre-selection magic program (FPM) and the dual-range automatic program (P). When the card is inserted into and seated in the recess, the symbol of the selected mode is displayed in the window. Without the use of any card, it is possible to set a desired mode into the camera by the first controlling push button.

As the mode symbol displayed is cleared by supply of a battery into the camera to "TP", if the desired mode is different from "TP", the photographer needs to depress the first button so that all the symbols are sequentially displayed, and this sequence repeats itself so long as the first button is depressed. As soon as the symbol of the desired mode appears, the photographer has to release the button. Thus, the desired mode is manually set into the camera. A safety button is provided to prevent the occurrence of accidental correction of the display of the mode symbol, accidental correction of a digital value of film speed, and accidental correction of a possible maximum number of film frames by the second and third buttons. While depressing the safety button, the photographer can depress the second button to sequentially display the values of the film speed in discrete progression, beginning with "100" in ASA as the cleared state. As soon as the corresponding value to that of the used film appears at the window, the photographer has to release either one of the buttons. Such setting procedure applies similarly to the third button for continuous progression of integer numbers from zero.

With "TP", or "TPM" selected, when the shutter time takes a value of 1/500 second causing a number "500" to be displayed to the right of the heading "TP" or "TPM", correction can be effected by first pushing a lock button which also serves as an actuator for the same switch of the safety button and then actuating a slide knob for upward or downward movement depending upon the setting of larger or smaller values, i.e., faster or slower, shutter time values, respectively. Just after the readout of the corresponding number to a value to be set appearing on the display, the photographer must rapidly release either the knob or the button to its initial inactive position. Next, upon change to "FP" or "FPM" mode, the shutter time display is blanked out and, instead, the diaphragm value that depends on the last readout in "TP" or "TPM" mode is displayed in an F-number. If the photographer desires to change this value to a larger or smaller value, i.e., a smaller or larger size of the diaphragm aperture, he first presses the button and then moves the knob upward or downward, respectively. In the "P" position, the shutter and diaphragm are controlled in accordance with a predetermined program, for example, at equal rates over the entire ranges of controls. Therefore, the digital display is maintained in a blanked-out condition.

The phrase "communicating system" is intended to include, but is not limited to, fax lines, phone lines, modem, TI line, Internet, DSL, cable modem, dial-up Internet, wide area network, Intranet, local area network, ISDN, wireless connections, satellite communications, direct cable connection, radio communication, and audio communication. The communicating device of the present invention preferably includes a processor for processing and selectively communicating information.

The processor can include a security device that selectively allows access to the system. For example, an individual can only obtain access to their specific item. The security device can be a passcode such as an access code, PIN number, a URL with an identification number, or other similar device as set forth in more detail below.

Preferably, the processor is an i960SB processor capable of executing more than four million instructions per second. Generally however, the processor is not capable for calculating pixel data for animated images where the required rate of calculation is approximately 13.33 million pixels per second. This function is provided in a real-time object (RTO) processor.

The RTO processor reads object lists from the RAM and operates in real-time, rendering the outline information with the use of a dedicated quadratic polynomial fragment (QPF) RAM. The RTO processor calculates outline intersections with every scanned line, re-sorts the outlines if any should cross over, and determines the viewing object priority. This priority determines which object is on top for each section of a scanned line. The object priorities are output in real-time at a resolution of 720 pixels per line. This information is then passed to a color look-up table included within the DAC that assigns a color to each object level. This color can be any of 16 million colors in a digital video palette. This output can be either RGB as shown illustrated, or YUV, in CCIR601 4:4:4 formats. The DAC can, for example, be a standard 478 type RAM DAC.

A coder is designed to take an analog video input signal, in this case a standard NTSC analog signal, and convert that signal into digital form, in this case a standard CCIR (or D1) digital data stream. D1 is a recognized standard format in the video and broadcast field and is in wide use in equipment that is designed to process digitized video signals. Therefore, the present invention is compatible and designed for use with any equipment adhering to the D1 standard.

An alternative embodiment utilizes streaming. Streaming is an emerging technology. While some multimedia products use proprietary streaming mechanisms, other products incorporate standards. The following are examples of emerging standards for streaming protocols. Data streams are delivered using several protocols that are layered to assemble the necessary functionality.

Real-time Streaming Protocol (RTSP) is a draft Internet protocol for establishing and controlling on-demand delivery of real-time data. For example, clients can use RTSP to request specific media from a media server, to issue commands such as play, record and pause, and to control media delivery speed. Since RTSP simply controls media delivery, it is layered on top of other protocols, such as the following.

Real-Time Transport Protocol (RTP) provides actual delivery of streaming data occurs through real-time protocols such as RTP. RTP provides end-to-end data delivery for applications transmitting real-time data over multicast or unicast network services. RTP conveys encoding, timing, and sequencing information to allow receivers to properly reconstruct the media stream. RTP is independent of the underlying transport service, but it is typically used with UDP. It can also be used with Multicast UDP, TCP/IP, or IP Multicast.

Real-Time Control Protocol (RTCP) is a system where RTP is augmented by the Real-Time Control Protocol. RTCP allows nodes to identify stream participants and communicate about the quality of data delivery. Possible Product Options include Netscape's Media Server, Progressive Networks Real Audio/Video, and VXtremes WebTheater.

The following are examples of products that implement Streaming Messaging (based upon RTSP or other standards or proprietary approaches) Netscape's Media Server, Progressive Networks' Real Video, and VXtreme's WebTheater.

The phrase "security device" as used herein is intended to include, but is not limited to, an access code or other device used for enabling an individual to access the system. For example, Security Services enforce access control to ensure that records are only visible or editable by authorized people for approved purposes. Most database management systems provide access control at the database, table, or row level as well as concurrency control. The security component prevents unauthorized users from accessing the individual's information or viewing the individual's item by providing the users with access codes—password & ID—that allows the user to login to the system or execute any (or a particular) application. This security device is optional. In other words, the invention as set forth herein is functional without the security device.

Security components can restrict access to functions within an application based on a users security level. The highest level of security is whether the user has access to run the application. The next level checks if the user has access to functions within the application, such as providing information regarding the items or updating the images.

Security usually resides on both the client and server platform in a distributed environment. True security should always be placed on the server platform, to protect the system through access outside of a client application.

Another form of security is encryption services. Encryption services encrypt data prior to network transfer to prevent unauthorized interception. (Note that encryption can occur within the Communications Services layer, the Transport Services layer, or the Network Media Services layer.) Within the Communications Services layer, encryption occurs at the top of the protocol stack and is typically performed within an application (e.g., an e-mail application, a Web browser). This is an end-to-end approach that can leave the remainder of the protocol stack (i.e., the Transport services and the Network Media services) unaffected.

Encryption has two main components: the encryption algorithm, which is the series of steps that is performed to transform the original data; and the key, which is used by the algorithm in some way to encrypt the message. Typically, the algorithm is widely known, while the key is kept secret. There are several types of encryption in use today, including: secret key cryptography uses one key (the secret key) both to encrypt the message on one side and to decrypt the message on the other side and public key cryptography uses two keys, the public key and the private key. The public key and private key are mathematically related so that a message encrypted with the recipient's public key can be decrypted with the recipient's private key. Therefore, the public key can be widely published, while the private key is kept secret.

There are also varying methods of employing encryption types described above to encrypt data sent across a network: Examples of this include encryption on the data link layer. In this form of encryption data is encrypted before it is placed on the wire. Data link encryptors are generally hardware products. Another for is at the application layer. In this form data is encrypted by the application. Netscape's Secure Sockets Layer (SSL) is one example of application-layer encryption for WWW browsers. SSL uses RSA encryption to wrap security information around TCP/IP based protocols. Yet another form of encryption is at the network layer, here data is encrypted inside the network layer header, therefore relying on the network layer protocol.

As stated previously, the system can be used for monitoring either items/objects and/or activities. The items that can be monitored are any item that can be photographed and have it's image sent via the Internet.

In the preferred embodiment, the system functions as follows. First, a digital image is taken that captures the activity or item. The digital image can be captured on any machine capable of producing digital images. The preferred mode for capturing digital images is via a digital camera. The camera can either be moved around by the individual taking the image or it can be mounted at a fixed location where it periodically takes additional images. Alternatively, real time video can be used in the system.

While the digital image can be captured by simply taking a photograph of the desired object or activity, optionally the image can contain additional information. If the image is to contain the additional information, then the following options can be added to the basic image. First, a photo of a clock can be taken, thus indicating the time at which the photo was taken. Second, a photo of status information can be taken. The status information is information that explains the current status of the item or activity. This information allows the viewer to know the exact status of the item or activity as of the time that the image is taken. For example, a form of listing the different stages available can be photographed. Also included in the image can be a visual identifier. The identifier appears in the image just prior to the item or activity to which it refers. The identifier can be a number a letter or any other symbol that distinguishes the item/activity from others. Once the identifier's image has been captured, the image of the desired item/activity must be captured. This procedure is then repeated for each additional item/activity.

Once the entire image collection is captured, the images are transferred to a processor. The processor receives and stores the images. The processor sifts through the images and assigns the images and status information to the appropriate item/activity. In other words, the processor organizes all of the images to be in proper order and in proper configuration for further processing.

Alternatively, instead of utilizing a photo of status information or written information the following automated procedure can be utilized. First, barcodes or other optical recognition coding can be used to distinguish between a number of stages of readiness. For example, the numeral one could indicate waiting on insurance, the numeral two indicates disassembly, the numeral three indicates waiting for parts, the numeral four indicates structure repair, the numeral five indicates body repair, the numeral six indicates paint, the numeral seven indicates reassembly, the numeral eight indicates final preparation, the numeral nine indicates complete, and the letter "M" indicates mechanical repairs. Once the photo of the item has been taken, software scans an identification sheet for a valid barcode or other identifier. If a valid barcode or identifier is found, then the software assigns the proper identification to the photos. If for some reason an invalid barcode or identifier was not found, a human operator can be prompted to interpret the identification sheet image and assign the proper identification code to the item. Once the item identification is affixed to the photo, then the software can scan the item for the item identification sheet for stage information. If valid stage information is determined, then the software can assign the proper stage and status to the photo for viewing by the customer. If there is a problem with the stage code, then a human operator can be prompted to interpret the proper stage and assign the proper stage and status information to the photo. After the proper stage and status have been identified on the photo, then the software assigns the proper date and time to the item indicating current date and when the item will be ready. The photo is then processed and can then be received or viewed by the customer. Any software can be utilized for performing these functions, preferably scanning software as are known to those of skill in the art can be utilized. Any barcode software can be used in conjunction with the present invention as barcode software is known to those of skill in the art. Thus the information required for creating valid barcodes and other visual identifiers and software utilizing the same is known to those of skill in the art.

The "processor" of the present invention is preferably a computer, computer program, or other device or individual that can differentiate between types of information and selectively distribute the information according to guidelines set forth herein. Alternatively, the processor can be an individual who manually sorts the digital images and information. In the preferred embodiment, the processor is software that controls the flow of information between the customer and the company.

The images are categorized and stored for future retrieval. The storage can take place on server storage media, or any other similar media such as a database, which enables an individual to catalog information while retaining the ability to retrieve this information at a later time.

The information is requested from an individual partaking in the system. When the individual requests this information they connect to the server and request the information. The server then processes the request and retrieves links to the appropriate images. The image links and any status information are then sent to the requesting individual. This information can be refreshed at any time.

The above-described invention can be used to monitor the progress of vehicle repairs. In this situation, the status information enables the individual to know the stage of the repairs. The benefit of the present system over the prior art is that the prior art is limited to surveillance systems for security purposes. The systems are maintained by a security company and the individual being protected does not monitor anything. The present invention instead enables the individual to take control and monitor the item without requiring the participation of a third party. There is no suggestion in the prior art for creating a monitoring system that is monitored by the owner of the item being monitored. The prior art instead teaches systems which take control away from the individual and instead transfer the control to a third party. Further, the system of the present invention that utilizes a recorded image, a communicating system, and a security device is not taught nor suggested by the prior art. The prior art instead pertains to a closed circuit system that is directly linked to the company maintaining the monitoring system.

The invention can also be used to monitor the progress of construction or to monitor the activities at a child's day care facility or campground.

Additionally, the invention can include a survey system. The survey system includes a questionnaire that allows the company using the above services to obtain feedback from their clients. The survey enables the company to either resolve the problem before it occurs with another customer or resolve the problem with the current customer before the customer leaves. For example, if the customer is not pleased with the results of a dent removal, instead of having the customer complain at the end of the repair, the customer can register a complaint right away and have the problem corrected prior to the customer coming to pick up their vehicle.

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology that has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed is:

1. A monitoring system for remotely monitoring an item, said monitoring system comprising:
   recording means for recording a visual record of an inanimate item and recording a separate image of status of the item;
   automatic sorting means for automatically sorting the visual records;
   communicating means in communication with said recording means, said communicating means is used for communicating the visual record; and
   security means operatively connected to said communicating means, wherein said security means is used for controlling access to the monitoring system.

2. The monitoring system according to claim 1, wherein said communicating means is selected from the group consisting essentially of fax lines, phone lines, modem, TI line, Internet, DSL, cable modem, dial-up Internet, wide area network, Intranet, local area network, ISDN, wireless connections, satellite communications, direct cable connection, radio communication, and audio communication.

3. The monitoring system according to claim 1, wherein said security means is selected from the group consisting essentially of an access code, a PIN number, and password.

4. The monitoring system according to claim 1, wherein said recording means is selected from the group consisting essentially of a digital camera and standard cameras.

5. A method of remotely monitoring an inanimate item, said method comprising the steps of:
   recording a digital image of an inanimate item and recording a separate image of status of the item;
   automatically sorting the visual records;
   communicating the digital image of the item through a communication system; and
   accessing the digital image using a secured access device.

6. The method according to claim 5, wherein said recording step includes scanning a photograph into a computer thereby creating a digital image.

7. The method according to claim 5, wherein said recording step includes utilizing a digital camera to digitally record the image of the item.

8. The method according to claim 7, wherein said recording step further includes digitally photographing the item.

9. The method according to claim 7, wherein said recording step further includes digitally videotaping the item.

10. The method according to claim 5, wherein said accessing step includes accessing the digital image using a passcode.

11. The method according to claim 5, wherein said recording step includes recording the image of status of an item then recording the image of the identifier and then recording the image of the activity or item.

12. The method according to claim 5, further including the step of surveying a user of the system with regard to the activity or item.

* * * * *